(12) United States Patent
Anumulapally et al.

(10) Patent No.: US 11,893,550 B2
(45) Date of Patent: Feb. 6, 2024

(54) SYSTEM AND METHOD FOR HOSTING AND REMOTELY PROVISIONING A PAYMENT HSM BY WAY OF OUT-OF-BAND MANAGEMENT

(71) Applicant: THALES DIS CPL USA, INC, Belcamp, MD (US)

(72) Inventors: Ranga Anumulapally, Belcamp, MD (US); Ian Merin, Belcamp, MD (US); Kathryn Roberts, Belcamp, MD (US); Gerald Wardrop, Belcamp, MD (US); Linden Decarmo, Belcamp, MD (US); Raghvendra Chouhan, Belcamp, MD (US)

(73) Assignee: THALES DIS CPL USA, INC., Austin, TX (US)

( * ) Notice: Subject to any disclaimer, the term of this patent is extended or adjusted under 35 U.S.C. 154(b) by 279 days.

(21) Appl. No.: 17/336,742

(22) Filed: Jun. 2, 2021

(65) Prior Publication Data

US 2022/0391856 A1    Dec. 8, 2022

(51) Int. Cl.
  *G06Q 20/02* (2012.01)
  *G06F 9/54* (2006.01)
  *G06Q 20/40* (2012.01)
  *G06Q 20/38* (2012.01)

(52) U.S. Cl.
  CPC ............. *G06Q 20/02* (2013.01); *G06F 9/547* (2013.01); *G06Q 20/38215* (2013.01); *G06Q 20/4097* (2013.01)

(58) Field of Classification Search
  None
  See application file for complete search history.

(56) References Cited

U.S. PATENT DOCUMENTS

| 10,949,527 B2* | 3/2021 | Tanimoto | H04L 9/3234 |
| 2014/0282936 A1 | 9/2014 | Fitzgerald | |
| 2019/0228133 A1* | 7/2019 | Ansari | H04L 9/0643 |

(Continued)

OTHER PUBLICATIONS

Anonymous: "Out-of-Band Management: What is it and why do I need it", Aug. 9, 2020, pp. 1-3, XP055960864, Retrieved from the Internet: URL:https://www.perle.com/supportfiles/out-of-band-management.shtml [retrieved on Sep. 14, 2022] pp. 1-3.

(Continued)

*Primary Examiner* — Umut Onat

(57) ABSTRACT

A payment HSM hosted in a data center and comprising a host interface accessible by a remote end-user entity running a payment application using critical resources protected in the payment HSM, a second interface for main, operational management of the payment HSM by the end-user entity, and an Out-Of-Band, OOB, management interface being distinct and physically isolated from the communication channel of the second interface, and configured to allow secure access to the payment HSM by a third-party entity, distinct from the end-user entity. A resident, remotely configurable provisioning state-machine is implemented in the HSM for the management of the provisioning of the payment HSM for service to one or more end-user entities, under the control of the third-party entity over the OOB management interface.

18 Claims, 10 Drawing Sheets

(56) References Cited

U.S. PATENT DOCUMENTS

2020/0320489 A1    10/2020  Vagare
2021/0232337 A1*  7/2021  Talvitie .................. G06F 21/74

OTHER PUBLICATIONS

PCT/US2022/031498, International Search Report and Written Opinion of the International Searching Authority, dated Sep. 16, 2022, European Patent Office, P.B. 5818 Patentlaan 2 NL—2280 HV Rijswijk.

* cited by examiner

SYSTEM AND METHOD FOR HOSTING AND REMOTELY PROVISIONING A PAYMENT HSM BY WAY OF OUT-OF-BAND MANAGEMENT

BACKGROUND

Technical Field

The present invention generally relates to the field of cloud-based on-demand protection security services, and more specifically to systems and methods for hosting and remotely provisioning a payment Hardware Security Module (HSM) by way of Out-of-Band (OOB) management.

It finds non-limiting applications in cloud-based payment system processing environments for credit, debit, e-purse and chip cards, as well as internet payment applications, for instance.

Related Art

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A payment HSM is a hardened, tamper-resistant hardware device that is used to safeguard and manage digital authentication keys, and to perform crypto-processing using encryption and decryption functions for digital signing, strong authentication and other cryptographic functions without revealing decrypted data. For instance, HSMs allow providing high levels of protection for cryptographic keys and customer PINs used during the issuance of magnetic stripe and EMV chip cards (and their mobile application equivalents) and the subsequent processing of credit and debit card payment transactions. EMV is short for "Europay, MasterCard, and Visa", namely the 1994 founders of a payment method based upon the so-called EMV technical standard for smart payment cards and for payment terminals and automated teller machines which can accept them. In the jargon of the person skilled in the art, further, EMV commonly refers to a credit card with a smart chip. The EMV standard is a security technology used worldwide for all payments done with credit, debit, and prepaid EMV smart cards.

For more than three decades, payment HSMs have been involved in a wide range of applications, primarily in the retail banking industry and more specifically in the payment card industry. For example, customers, such as banks, credit card processing companies, or retail stores may execute applications using highly critical information to process secure payment transactions which involve customers' EMV smart cards, for instance. This critical information comprises protected resources, such as PINs and private keys that matched public keys and certificates used for secure socket layer connections to the bank's or credit card processing company's servers.

The main role of a payment HSM is to protect cryptographic keys and other security sensitive data in a highly secure manner, such that the integrity of the overall payment process is maintained. To that end, HSMs offer the highest level of security by always storing cryptographic keys in intrusion-resistant hardware. Commonly, HSMs are housed in a data center of a computing resource provider or any similar securely hosting area. More specifically, any HSM hosted in the data center may be attached directly to a server, for instance in a rack, and can be accessed on-site by an operator e.g., through console attached to the HSM via a universal serial bus (USB) connection implementing a USB-C interface, for example.

In a conventional remotely hosted payment infrastructure, one or more payment HSMs may be deployed in a data center, and are allocated to end-user clients by a cumbersome process performed manually by an operator, on-site.

Stated otherwise, an on-site manual access to the HSM server allows provisioning the hosted HSM to specific end-user client(s) during the deployment lifecycle of a payment system.

Subsequently, and over the entire system's lifetime, end-user's payment applications may remotely access resources in the HSM using a conventionally known secure system's client/server architecture. Such remote access also allows for highly flexible HSM management by end-users via a secure management interface, for configuration of the HSM during the operation lifecycle, which meet the requirements of complex network infrastructures and demanding business environments. This supports multiple types of payment service offerings and offers more capabilities to run functions securely in a broader range of operating environments.

However, in the context of the digital payments world which increasingly looks towards new deployment models involving a mixture of private and public clouds, there is a need to offer a secure remote management scheme which can be implemented at the initial step of provisioning HSMs to end-users, thus delivering an enhanced, true 'no touch' provisioning experience.

Reference US 2014282936 discloses a computer-implemented method allowing a customer of a computing resource provider to request the addition of a device, which can be a hardware security module (HSM), to a network of the customer hosted by the computing resource provider. The computing resource provider reconfigures a set of computing resources so that the devices of the customer are able to communicate with the device as if the device was in the customer's own network.

With such a design, remote management is only possible/available through the end-user dedicated management interface of the HSM. It follows that only the end-user can commission the HSM for payments set-up and use. Else, that is if the end user was willing to commit a service provider to commission a hosted HSM in the data center, then the management interface of the HSM would have to be shared by both entities, namely the end-user and the service provider, thereby subjecting both to management and security compromises.

SUMMARY

The invention aims to remedy all or some of the disadvantages of the above identified prior art, by providing a solution to facilitate the provisioning of HSMs to end-user, that it more flexible than remote HSMs provisioning and management schemes known in the art.

To address these needs, a first aspect of the present invention relates to a payment Hardware Security Module, HSM, comprising:

a first interface configured to allow remote access to the payment HSM over a communication network by at least one remote end-user entity running at least one payment application adapted to use critical resources protected in the payment HSM when said payment HSM is physically hosted in a data center accessible through said communication network;

a second interface supported by a given communication channel over the communication network and configured to allow for main, operational management of the payment HSM by the end-user entity, wherein the payment HSM further comprises:

a third interface supported by a communication channel over the communication network being distinct and physically isolated from the communication channel of the second interface, and configured to allow secure access to the payment HSM by a third-party entity, distinct from the end-user entity, e.g. a service provider, for Out-Of-Band, OOB, management of the payment HSM by the third-party entity; and, a processor configured to implement a resident, remotely configurable provisioning state-machine for the management of the provisioning of the payment HSM for service to one or more end-user entities, through one or more transitioning methods under the control of the third-party entity over the third interface as part of the OOB management; and a memory on which are stored machine-readable instructions that, when executed by the processor, cause the processor to additionally perform said configuration of said first interface, second interface and third interface.

This allows isolation of secure remote management by the service provider which effectively creates separate security zones for an end user acting as a first entity and for a service provider acting as a second entity, respectively.

Thus, thanks to the payment HSM being remotely configurable via multiple interfaces by both a service provider and one or more end-users, the system enables remote provisioning of HSMs deployed in a hosted environment by the service provider prior to hand-off to the client for commissioning.

In the data center zone, the management interface—which can be a conventional USB-C interface—may be used for initial configuration only, through a local console. In contrast, in the former stand of the art using designs known to date, USB-C interface was used for all configuration throughout the HSM service, not just for initial configuration. Embodiments of the invention thus provide service providers with the ability to use micro-services to remotely monitor and diagnose the hosted payments HSM during the entire deployment lifecycle. In particular, on-site manual and cumbersome provisioning processes may be avoided while performing deployment of a new payments system dedicated to a specific end-user.

Advantageously, embodiments are not specific to any service provider in particular, but are expected to be used by other service providers similarly.

According to various embodiments, the HSM can additionally comprise one or more of the features below, which should be considered in any possible technical combinations:

the provisioning state-machine can be configurable by the third-party entity via one or more specific Application Program Interfaces, APIs, adapted to implement the transitioning methods;

the provisioning state-machine can be configurable by the third-party entity via one or more specific APIs complying with the Representational State Transfer, REST, style of architecture and adapted to implement the transitioning methods as REST methods;

the provisioning state-machine can comprise at least three states, including a first state of not being allocated to an end user, a second state of being allocated to an end-user but not being commissioned for said end-user, and a third state of being commissioned for an end-user;

the transitioning methods can comprise one or more of:
allocating the payment HSM to a given end-user;
commissioning the payment HSM for the end-user to which said HSM was allocated;
voluntarily releasing the payment HSM by the end-user entity to which said HSM was allocated and for which it was commissioned; and,
reclaiming by the third party entity of the payment HSM that was allocated to an end-user.

the third interface can be configured to allow secure access to the payment HSM by the third-party entity based on one or more of a mutual authentication scheme, a client white-listing scheme, a fingerprinting scheme and a server attestation scheme to restrict access to the third interface;

the mutual authentication scheme can be adapted to implement a certificate-based mutual authentication, e.g., a Transport Layer Security, TLS, certificate-based mutual authentication the third interface can be further configured to allow key management and access control policy enforcement by the third-party entity, as part of the OOB management of the hosted payment HSM in addition to the provisioning management the critical resources protected in the payment HSM can comprise digital keys, PIN codes, and/or encryption and decryption functions usable by a payment application run by the end-user entity the HSM can further comprising a hardware interface, for instance a serial interface such as a USB-C interface configured to allow a local console to execute solely initial configuration of the hosted payment HSM.

A second aspect of the present invention relates to a Web-based payment system comprising at least one payment Hardware Security Module, HSM, according to the first aspect, hosted in the data center, with a processor configured to execute a state-machine to provide a remote management scheme of provisioning the payment HSM to at least one end-user entity.

A third aspect of the present invention relates to a method of deploying a payment Hardware Security Module, HSM, in a Web-based payment system comprising:

physically housing the payment HSM according to the first aspect in a data center and connecting said payment HSM to the Web as the communication network;

allowing a third-party entity to securely access the payment HSM over communication network through the third interface as part of the OOB management, and to remotely control the provisioning state-machine of said payment HSM through the one or more transitioning methods, for provisioning the payment HSM for service to one or more end-user entities;

allowing remote access to the payment HSM by the end-user entity to which the payment HSM was allocated and for which it was commissioned, over the communication network through the second interface as part of the main, operational management of the payment HSM; and, allowing remote access to the payment HSM by the end-user entity over the communication network through the first interface when said end-user entity runs at least one payment application adapted to use critical resources protected in the payment HSM.

A fourth aspect of the invention relates to a Web-based payment system comprising:
- at least one payment Hardware Security Module, HSM, physically hosted in a data center and remotely accessible, over a communication network, by at least one remote end-user entity running at least one payment application adapted to use critical resources protected in the payment HSM,
- said HSM comprising:
- a processor; and,
- a memory on which are stored machine-readable instructions that, when executed by the processor, cause the processor to perform configuration of:
  - a first interface to allow remote access to the payment HSM over the communication network by the end-user entity;
  - a second interface supported by a given communication channel over the communication network to allow for main, operational management of the payment HSM by the end-user entity,
  - a third interface supported by a communication channel over the communication network being distinct and physically isolated from the communication channel of the second interface, to allow secure access to the payment HSM by a third-party entity, distinct from the end-user entity, for Out-Of-Band, OOB, management of the payment HSM by the third-party entity,
- and cause the processor to additionally implement a resident, remotely configurable provisioning state-machine for the management of the provisioning of the payment HSM for service to one or more end-user entities, through one or more transitioning methods under the control of the third-party entity over the third interface as part of the OOB management.

In a particular embodiment, the Web-based payment system further comprise the data center.

According to respective embodiments, the Web-based payment system can comprise one or more of the following features:
- the provisioning state-machine can configurable by the third-party entity via one or more specific Application Program Interfaces, APIs, adapted to implement the transitioning methods;
- the provisioning state-machine can comprise at least three states, including a first state of not being allocated to an end user, a second state of being allocated to an end-user but not being commissioned for said end-user, and a third state of being commissioned for an end-user;
- the system can additionally comprise a local console configured to execute solely initial configuration of the hosted payment HSM through a hardware interface for instance a serial interface such as a USB-C interface.

A fifth aspect relates to a method of deploying a Web-based payment system to an end-user entity comprising the steps of:
- by way of a payment Hardware Security Module, HSM, physically hosted in a data center accessible through a communication network and operatively configured to enter one of
  - a first state of not being allocated to an end user entity,
  - a second state of being allocated to an end-user entity but not being commissioned for said end-user entity, and
  - a third state of being commissioned for an end-user entity running at least one payment application adapted to use critical resources protected in said payment HSM by way a first interface configured to allow remote access to the payment HSM over said communication network by said end-user entity:
- from the first state, by way of a second interface supported by a given communication channel over the communication network and configured to allow for main, operational management of the payment HSM by the end-user entity, transitioning from the first state to the second state; and,
- from the second state, upon a successful commissioning of the HSM by the end-user entity, by way of a third interface supported by a communication channel over the communication network being distinct and physically isolated from the communication channel of the second interface and configured to allow secure access to the payment HSM by a third-party entity, distinct from the end-user entity, for Out-Of-Band, OOB, management of the payment HSM by said third-party entity, transitioning from the second state to the third state.

This invention might be regarded as the technological basis for an optional license (referred to in what follows as "hosted HSM license"), which shall be available and can be granted to limited customers as a service plan for hosting their HSMs in data centers. Licenses are typically comprised in license packages or are optional license, which are usually installed in the factory based on the purchase order issued by the customer to the manufacturer.

BRIEF DESCRIPTION OF THE DRAWINGS

Embodiments of the present invention are illustrated by way of example, and not by way of limitation, in the figures of the accompanying drawings wherein the same reference number represents the same element or the same type of element on all drawings, unless stated otherwise.

DESCRIPTION OF PREFERRED EMBODIMENTS

Figure 1A:
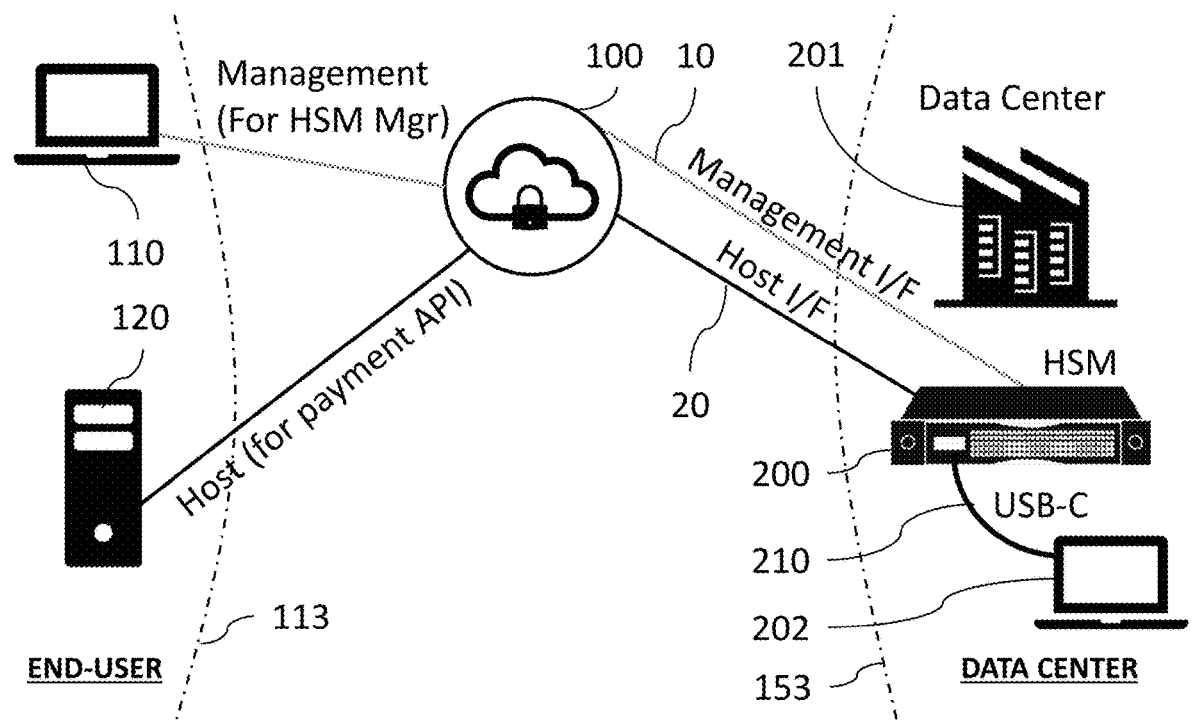
FIG. 1A is a schematic diagram showing a payment architecture known in the prior art.

The figures and the following description illustrate a specific exemplary embodiment of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

In the figures of the accompanying drawings, like reference numerals refer to similar elements. In addition, unless specifically indicated to the contrary, the disclosures contained in the entire description can be applied analogously to the same parts with the same reference signs or the same component identifiers.

Description of embodiments will provide a high-level overview of managing a hosted HSM, namely a HSM housed within a data center of a computing service provider. It details the provisioning life cycle of a hosted HSM and remote management of the hosted HSM by a third party service provider.

In the following description, well-known functions or constructions by the one skilled in the art are not described in detail since they would obscure the invention in unnecessary detail.

A payment HSM is a hardened, tamper-resistant hardware device that is used primarily by the retail banking industry to provide high levels of protection for cryptographic keys and customer PINs used during the issuance of magnetic stripe and EMV chip cards (and their mobile application equivalents) and the subsequent processing of credit and debit card payment transactions. Payment HSMs normally provide native cryptographic support for all the major card scheme payment applications and undergo rigorous independent hardware certification under global schemes such as FIPS 140-2, PCI HSM and other additional regional security requirements such as MEPS in France and APCA in Australia for example.

Some of their common use cases in the payments ecosystem include:
PIN generation, management and validation,
PIN block translation during the network switching of ATM and POS transactions,
Card, user and cryptogram validation during payment transaction processing,
Payment credential issuing for payment cards and mobile applications,
Point-to-point encryption (P2PE) key management and secure data decryption, and
Sharing keys securely with third parties to facilitate secure communications.

In the context of the present description, a "hosted HSM" is a HSM physically hosted by a computing service provider, that is to say, housed within, e.g., a data center.

A third party "service provider" is a vendor providing the hosted HSM service, that is a vendor selling HSM as a service, and a "customer" is an end-user of the hosted HSM's payment services.

The "provisioning" of a HSM refers to the process/procedure of managing the allocation of the hosted HSM allocation to a particular end-user.

A "provisioning state" is a state of the hosted HSM with respect to its allocation. In embodiments as described herein, there are three provisioning states, referred to as "DataCenter", "Allocated" and "EndUser".

The "commissioning" is the process of changing from using the pre-placed HSM manufacturer's trust to the customer's trust by the end-user.

The "warranting' is the process of establishing manufacturer's trust in the HSM (installed in the factory).

Further, "keylocks" are physical key locks located in the front of the HSM to lock/unlock the unit into/from the rack.

Further, "DCOps" (standing for Data Center Operations) refers to the operations personnel who have physical access to the hosted HSM in the data center.

The acronym "IP" designates any protocol of the Internet protocol suite for operation of network applications, such as, for instance:
in the Application layer of the OSI model: the Hypertext Transfer Protocol (HTTP) or its secure version HTTPS, DHCP, SMTP, TLS/SSL, etc.
in the Transport layer of the OSI model which can be used to transmit data over the Internet or any Local Area Network (LAN): the Transmission Control Protocol (TCP), the User Datagram Protocol (UDP) needing only one port for full-duplex, bidirectional traffic, the Stream Control Transmission Protocol (SCTP) and the Datagram Congestion Control Protocol (DCCP) which also use port numbers that match the services of the corresponding TCP or UDP implementation, if they exist;
in the Internet (Network) layer: Internet Protocol (IPv4 or IPv6), ICMP, IGMP, etc.

An "Application Programming Interface" (API) is a program that allows two systems to communicate with one another. An API essentially provides the language and contract for how two systems interact. APIs work using 'requests' and 'responses.' When an API requests information from a web application or web server, it will receive a response. The place that APIs send requests and where the resource lives, is called an endpoint. Simply put, an endpoint is one end of a communication channel. When an API interacts with another system, the touchpoints of this communication are considered endpoints. For APIs, an endpoint can include a URL of a server or service. Each endpoint is the location from which APIs can access the resources they need to carry out their function.

In described embodiments, there will be considered the non-limiting example of a cloud-based (web-based) payment system architecture, wherein a hosted HSM is housed in a data center and is remotely accessible by end-users through the Internet as a communication network. It will become apparent to the one with ordinary skills in the art, however, that other public and/or private communication, including for instance a Local Area Network (LAN), can be similarly contemplated. The architectural style for APIs is typically categorized as either being SOAP (former acronym for "Simple Object Access Protocol", but referring now to a "Service Oriented Architecture", SOA for Web services) or REST (Representational State Transfer), and both are used to access Web services. While SOAP relies solely on XML to provide messaging services, REST offers a more lightweight method, using URLs in most cases to receive or send information. REST uses different HTTP 1.1 verbs, also known as access "methods" to perform tasks. These methods are GET, POST, PUT, and DELETE, which refers to the reading, updating, creating and deleting of operations concerning resources, respectively. Unlike SOAP, REST does not have to use XML to provide the response. Some REST-based Web services output the data in Command Separated Value (CSV), JavaScript Object Notation (JSON) and Really Simple Syndication (RSS). The advantage with REST is that the output needed can be obtained in a form that is easy to parse within the language of the application specifically concerned.

In the embodiments of the invention presented herein, REST offers an alternative to, for instance, SOAP as method of access to a web service.

In order to be used in a REST-based application, a web service needs to meet certain constraints. Such a web service is called RESTful. A RESTful web service is required to provide an application access to its web resources in a textual representation and support reading and modification of them with a stateless protocol and a predefined set of operations. By being RESTful, web services provide interoperability between the computer systems on the internet that provide these services.

The Hypertext Transfer Protocol (HTTP) is designed to enable communications between clients and servers over the Internet. HTTP works as a request-response protocol between a client and a server. For example: a client (browser) sends an HTTP request to the server; then the server returns a response to the client. The response contains status information about the request and may also contain the requested content.

In a RESTful web service, requests made to a resource's URL will elicit a response with a payload formatted in HTML, XML, JSON, or some other format. The response can confirm that some alteration has been made to the resource state, and the response can provide hypertext links to other related resources. When HTTP is used, the operations (HTTP methods) available can comprise: GET, POST, PUT, DELETE, PATCH, and/or OPTIONS.

The two most common HTTP methods are: GET and POST. The GET method is used to request data from a specified resource. Like the PUT method, the POST method is used to send data to a server to create/update a resource. The data sent to the server with POST is stored in the request body of the HTTP request. The difference between POST and PUT is that PUT requests are idempotent. That is, calling the same PUT request multiple times will always produce the same result. In contrast, calling a POST request repeatedly have side effects of creating the same resource multiple times.

With reference to FIG. 1A, there is shown therein a cloud-based payment system infrastructure which can be deployed according to prior art methods. In this known design, at least one Hardware Security Module (HSM) 200 resides in a data center 201. The HSM 200 can be, for instance, the payShield® 10K of the manufacturer THALES Group, available from its subsidiary Thales DIS France S.A. in France.

HSM 200 is remotely accessible by an end-user 110 over a communication network 100, such as the Internet. Said remote access can be performed, firstly, through a first communication means (grey lines) which supports a management interface 10 (Management I/F) and, secondly, through a second communication means (black lines) which supports a host interface 20 (Host I/F).

The management interface 10 permits the end-user 110 to remotely manage the HSM 200 through the communication network 100, using an embedded application software referred to in what follows as the HSM Manager. The HSM Manager allows the end-user to perform various configuration/settings including but not limited to host application configuration, host command configuration, security settings, SNMP settings, pinblock settings, HSM Manager settings, fraud settings, audit settings, self-test settings etc. It further allows the end-user to manage its own data such as, for instance, Access Control List (ACL) for host interfaces, key material including but not limited to Local Master Keys (LMKs), Key Management Device (KMD) Transport Keys (KTKs), user storage, host application TLS keys and certificates, HSM Manager keys and certificates, HSM Recover Key (HRK), etc., and logs including but not limited to error log and audit log.

The host interface 20 permits payment applications (software) to be run, using authentication keys and encryption and decryption functions stored in the HSM and which stay unrevealed during such crypto-processing as digital signing, strong authentication and other cryptographic functions. These payment applications can be hosted in an application server 130 of the end-user. They can be made accessible to final users via, for instance, a payment API (this acronym standing for "Application Programming Interface") over the communication network 100. Final users can include e.g., banks, credit card processing companies, retail stores, etc.

The management interface 10 and the host interface 20 are separate and independently configured, on the HSM side, using independent network ports.

A local console 202 is serial connected over e.g., a USB-C interface 210. Serial interface 210 can be used by operations personnel, namely operators, referred to as DCOps (standing for Data Center Operations) in what follows, who have physical access to the hosted HSM for manually issuing commands to the HSM. Such USB-C interface is used, according to the standing state of the art, for all configuration throughout the HSM service, including initial configuration and cumbersome provisioning processes. The drawbacks of this state of the art have been extensively presented in the introduction of the present description, and are alleviated by embodiments of the invention.

Figure 1B:
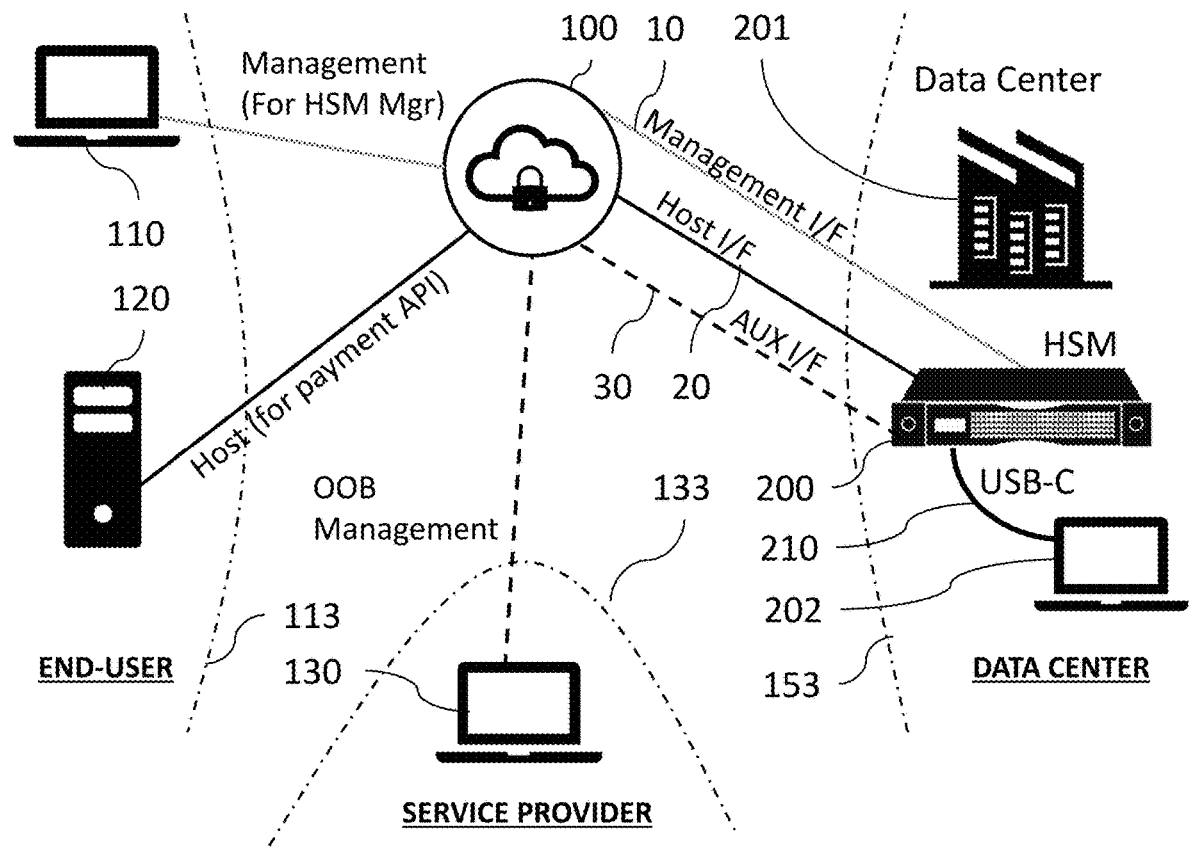
FIG. 1B is a schematic diagram showing a payment architecture according to embodiments.

Referring now to FIG. 1B, there is shown therein a schematic diagram of a payment architecture according to embodiments. FIG. 1B shows a HSM 200 in a hosted HSM deployment infrastructure of a data center incorporating the invention.

From a structural standpoint, the illustration of FIG. 1B comprises a replication of the already existing communication means to the HSM, consisting of the management interface 10 and the host interface 20. In addition thereto, however, the proposed architecture further include a third communication means (dotted black lines), which supports an additional interface 30, named the auxiliary (AUX) interface in the context of the present description.

From a functional standpoint, the HSM 200 (PS10K) according to this new design can be additionally managed by a third party entity 130, e.g., a cloud service provider, over the communication means which supports the AUX interface 30 of the HSM. For the service provider to manage the hosted HSM remotely, RESTful API endpoints are made available over the AUX interface. This is termed as out-of-band (OOB) management, since it uses an independent, dedicated communication channel that is structurally and functionally isolated from the end user's management of the HSM using HSM Manager over the management interface 20. OOB management has no dependency on the physical keylock states. The third-party entity 130 can be implemented as a personal computer (PC) or a virtual machine (VM) running ad-hoc application(s), for instance API referred to as OOB API and adapted to remotely manage the hosted HSM 200. The third-party entity 130 is also referred to as an "OOB client", since it operates as client in a client-server type configuration for communicating with the HSM 200 over the communication network 100.

The AUX interface 30 couples on the HSM to an OOB management software module, named an OOB Manager, which is run at level of the OBB client 130.

Advantageously, the communication means 10 and 30 can be physically isolated one from the other. In addition, the AUX interface details cannot be displayed in the HSM Manager. Thus the end-user 110 has no visibility of the AUX interface details via the HSM Manager or via SNMP (Simple Network Management Protocol). This ensures security of the overall payment system. Stated otherwise, the OOB Management thus permits isolation of secure remote management of the HSM 200 by the service provider 130, which effectively creates separate security zones 113 and 133 for the end-user 110 and for the service provider 130, respectively. It should be appreciated that, despite this functional isolation at operative level, the communication means 10 and 30 preferably share certain "automated" management controls that could otherwise conflict.

The introduction of a dedicated communication channel, namely the AUX interface 30 isolates the service provider's HSM management entity 130, namely the OOB Manager from the end-user's HSM management entity 110, namely the HSM Manager. The AUX interface 30 communication channel is what allows the OOB Manager 130 to remotely allocate the HSM 200 to the end-user and yet maintain certain operational control of the HSM in the data center area 153. The end-user 110 (e.g. HSM Manager) has no visibility of the AUX interface 30 through its Management interface 10. This isolates the end-user 110 from the service provider 130, from a management and security perspective.

In the design according to the prior art as previously discussed with reference to FIG. 1A, remote management was only possible/available through the Management interface 10. It would have been shared for both entities to use, namely end-user entity 110 or HSM Manager, and service provider entity 130 or OOB Manager, respectively, thereby subjecting both to management and security compromises. Stated otherwise, in the design of the prior art, only the end-user entity 110 could commission the HSM for payments set-up and use. The AUX interface 30 was not previously present and configurable for remote management.

In the new design according to embodiments, with the AUX interface 30 as an isolated and preferably dedicated communication channel, the service provider entity 130 can allocate control to the HSM and allow end-users to commission the HSM as a payment provider namely, hosted HSM services.

After physically installing the HSM in the rack of the data center 201, additional setup is needed for managing the unit remotely by the service provider. This can be done via the local console 202, through the serial connection using the USB-C interface 210. To that end, network cables can be connected to the network interfaces including the auxiliary (AUX) interface 30, in addition to the management interface 10 and the host interface 20. In some embodiment, by default all the network interfaces use DHCP, but can be changes to another IP protocol or any other type of protocol where appropriate.

In some embodiments, the OOB Manager exposes a RESTful API to HSM utilities, such that the service provider 130 can provision the HSM for service to end-users. According to this feature, RESTful API endpoints are introduced over the AUX interface 30 to the entity 130 (OOB Manager). The first endpoint is at the boundary of the HSM 200 and the AUX interface 30. The second endpoint is at the boundary of the OOB management software module 130 and the service provider 130.

Service providers have the ability to use micro-services to monitor and diagnose the hosted payments HSM during the entire deployment lifecycle.

In some embodiments, RESTful API function calls can take the form of HTTP requests that support the GET and POST methods using JSON objects (where JSON stands for "JavaScript Object Notation"). The RESTful API's expose proprietary HSM functions involved in HSM allocation and commissioning, thereby allowing service provider applications to manage the HSM provisioning. End-Users invoke the REST interface directly on the IP Address of the HSM. The RESTful API thus allows a cloud service provider to completely automate the deployment lifecycle of a hosted payment HSM. The HTTP requests that support the GET method can return a response with a JSON body. Some requests support the POST method and either accept arguments as a query parameter or as JSON in the request body.

The one with ordinary skills in the art will appreciate that such RESTful API based automation process is a complete contrast to a manual and cumbersome deployment process according to the prior art which has been described in the introduction in the context of the known architecture as shown in FIG. 1A.

In the data center zone 153, the USB-C interface 210 is used only for initial configuration through the local console 202. In contrast, in the original design of FIG. 1A, the USB-C interface 210 was used for all configuration throughout the HSM service, not just the initial configuration.

An advantage of the OOB management permitted by embodiments of the invention is that it allows automating the otherwise traditional manual process and control provisioning of multiple HSMs in a remote data center over multiple interfaces, and at certain times, while keeping end-user communications isolated. To that end, non-limiting embodiments can include a provisioning state-machine and methods for remotely configuring the state-machine, which shall be described in further detail below.

Figure 2:
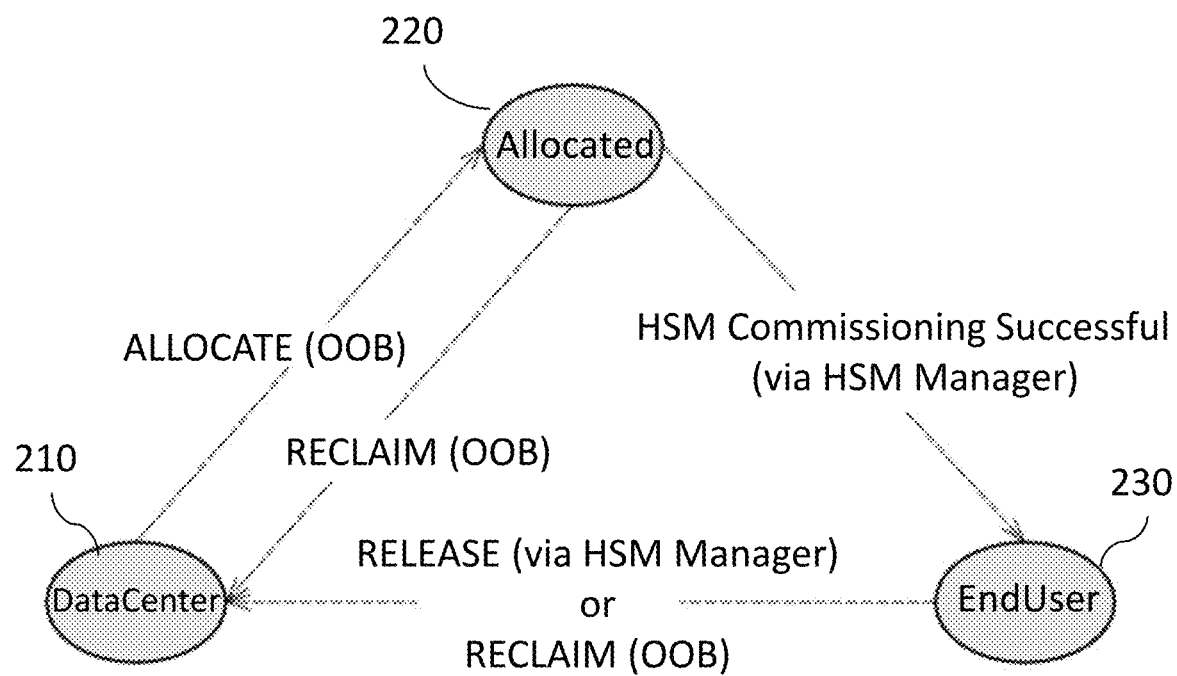
FIG. 2 is a schematic state diagram illustrating state transitions of a state-machine which can be implemented in the HSM according to embodiments.

With reference to FIG. 2, indeed, embodiments propose the introduction of a provisioning state-machine configurable by way of the RESTful API. Provisioning is the mechanism to manage the hosted HSM's allocation to a particular end-user, who can then commission the HSM unit. In the embodiment as shown in FIG. 2, there are three provisioning states.

In the so-called "Data Center" state 210, the HSM is not allocated to any end-user and is under full control of the service provider. In the so-called "Allocated" state 220, the HSM is allocated to a particular end-user and that end-user has not started using it. There is also a reclaim action between states 210 and 220, which can be performed by using the "/provisioning/reclaim" OOB API endpoint. In the End-User state 230 the HSM is now being used by the end user to whom it was allocated. This state indicates to the service provider that the customer has started using the HSM, and may proceed to configure the HSM (using the HSM Manager 110) with the desired settings and keys to start using the HSM's payment services. The end-user can relinquish/release the device voluntarily when finished using the HSM, thereby returning to state 210 for allocation to another end-user.

More details of the operation of the provisioning state-machine of FIG. 2 is presented in what follows. This presentation is purely illustrative, and shall not be construed to limit the scope of the present disclosure in any way. In particular, the one with ordinary skills in the art will appreciate that the state-machine is not intended to be limited by, e.g., the number, functional description and name of the provisioning states as presented.

In one example, the HSM can be set by default into the "DataCenter" state within the factory of manufacturer, when the "Hosted HSM" license is loaded into the hardware. In the "DataCenter" state, the service provider can "prepare" the HSM for allocation to an end-user, before actually allocating the HSM to an end-user.

After the necessary preparation, the service provider would allocate the HSM to the desired end-user using the "/provisioning/allocate" OOB API endpoint. The provisioning state can be changed to "Allocated" when the "Allocate" command is received and successfully processed by the HSM. The service provider can notify the customer that the HSM has been allocated.

Upon receiving the allocation notification, the end-user can commission the HSM using the HSM Manager. More specifically, once the HSM is allocated to a customer, the HSM Manager is the only interface to manage the HSM. Once the HSM has been successfully commissioned, the provisioning state can be changed to "EndUser". This indicates to the service provider that the customer has started using the HSM. The end-user can then proceed to configure the HSM (using the HSM Manager) with the desired settings and keys to start using the HSM's payment services.

When the end-user has finished using the HSM, they will relinquish/release the device voluntarily by choosing the "Release Device" button in HSM Manager.

After acknowledging the release prompt:
all customer data including key material and customer logs are erased;
customer settings are reset to service provider settings;
provisioning state is changed to "DataCenter"; and
the device is rebooted.

According to embodiments, further, the "/provisioning/reclaim" OOB API endpoint can be used if the service provider needs to reclaim (or repossess) the HSM that is currently allocated to a customer. The result of this reclaim operation is same as "Release Device" by the end-user. Reclaim can be issued when the device is in the "Allocated" or in the "EndUser" provisioning state.

The one with ordinary skills will appreciate that any provisioning state of the HSM is persistent, i.e., it persists reboots and power cycles of the HSM.

According to some embodiments, in the "Allocated" and "EndUser" provisioning states, the HSM can still be remotely managed by the service provider. However, a limited subset of commands/actions can be allowed.

Figure 3A:
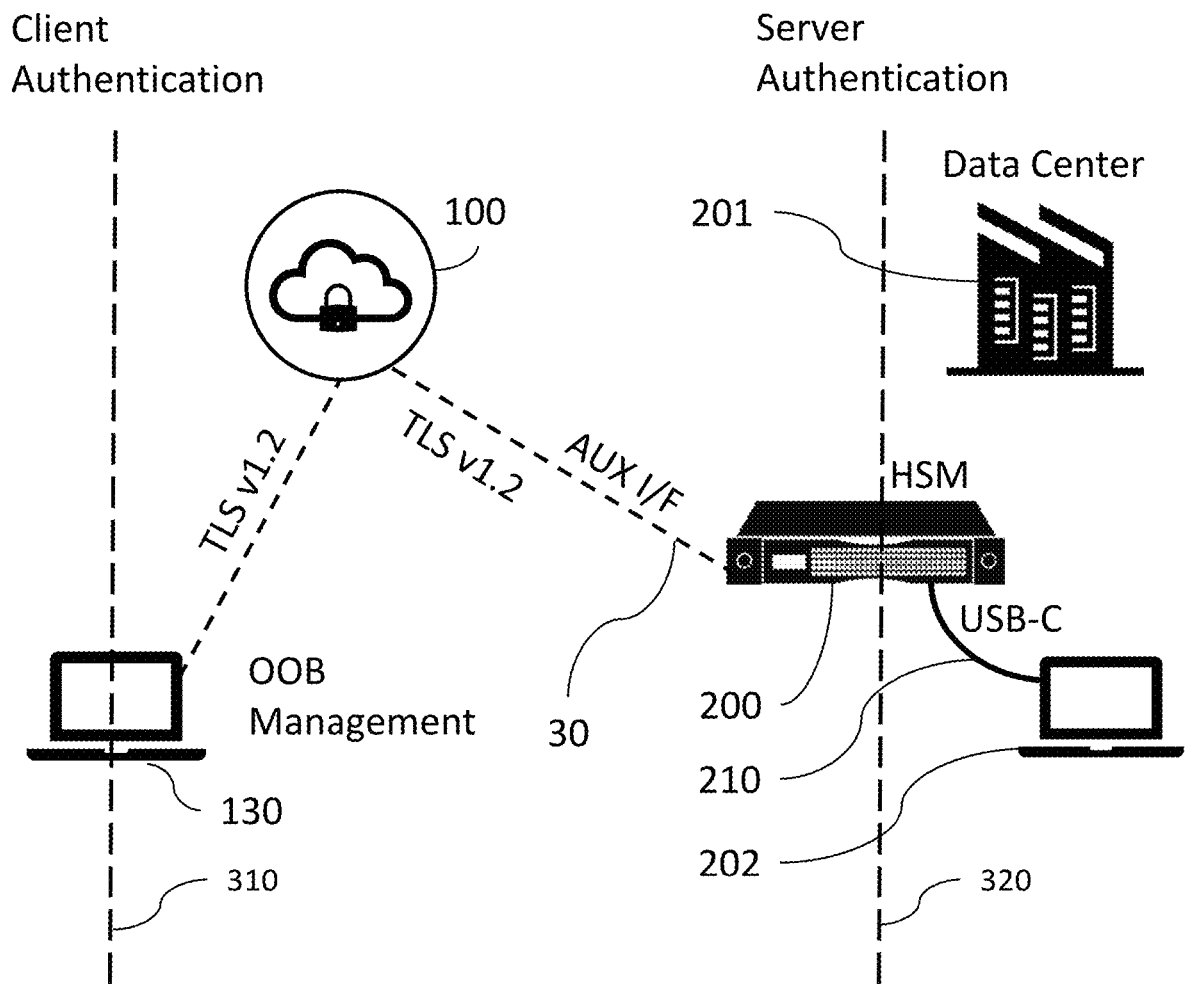
FIG. 3A is a schematic illustration of an example mutual authentication scheme, which can be implemented to allow secure access to the HSM by a remote service provider's machine according to embodiments.
Figure 3B:
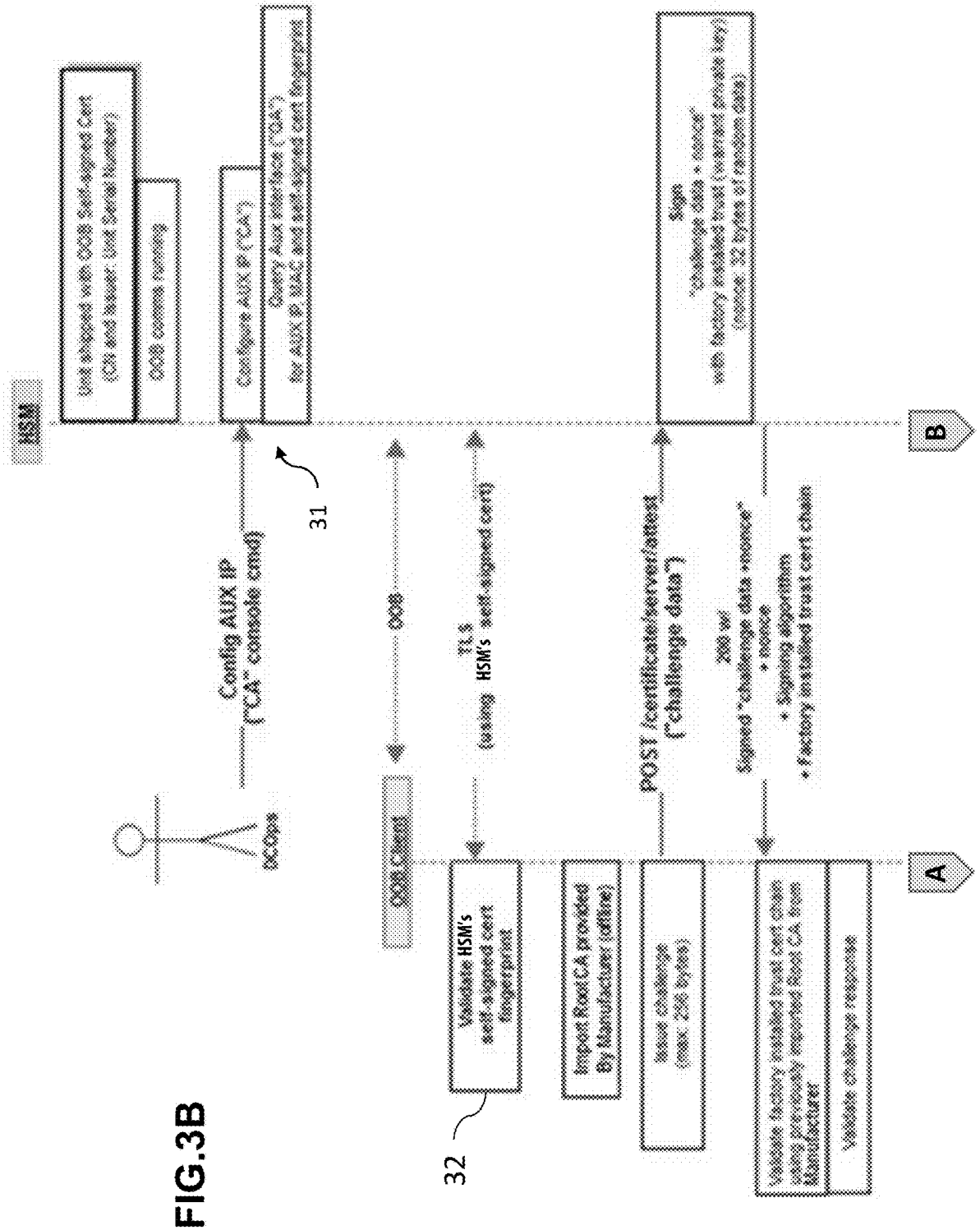
FIGS. 3B and 3C are a flow chart illustrating steps of a client-server authentication method according to the mutual authentication scheme of FIG. 3A.
Figure 3C:
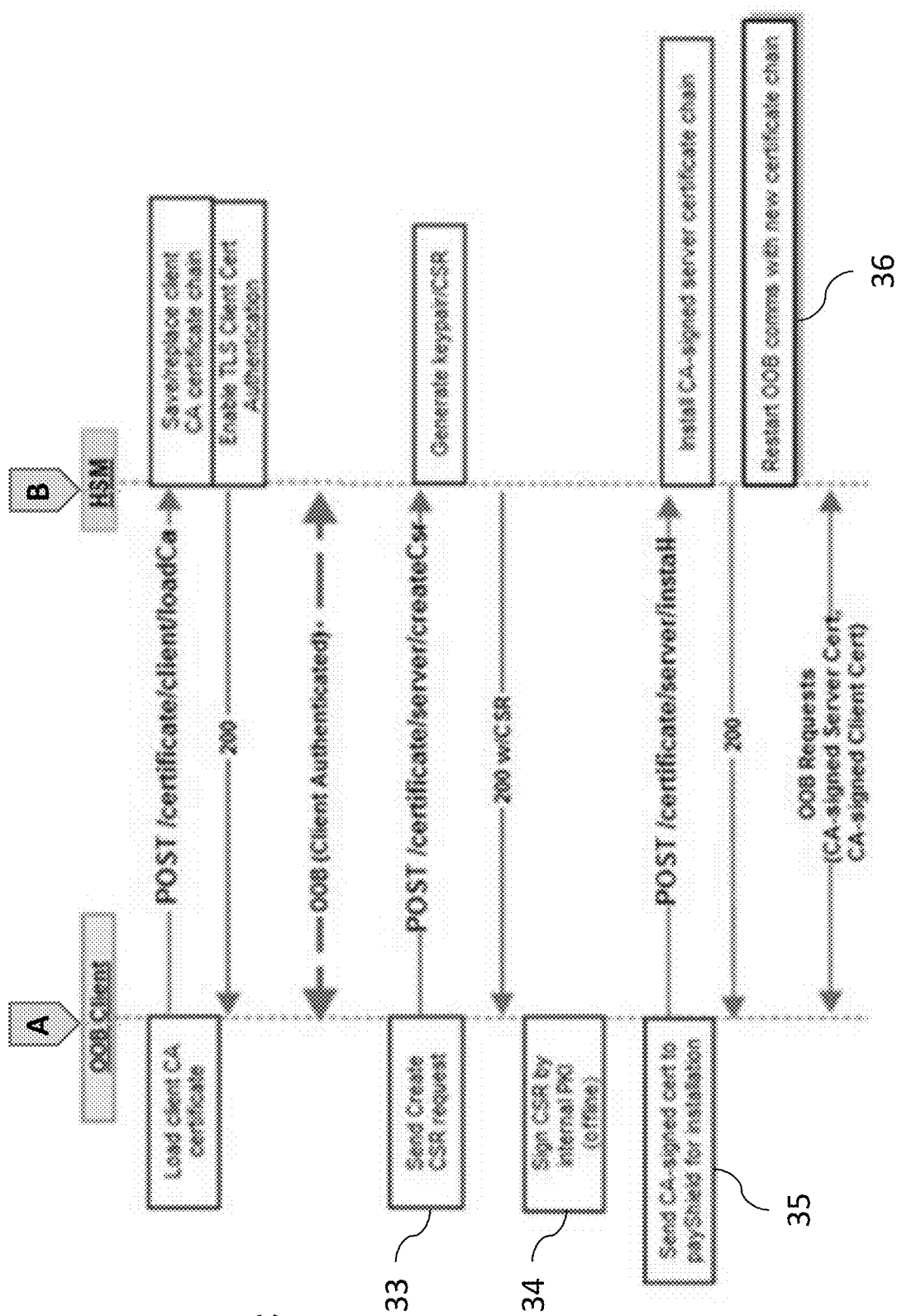

Referring now to FIGS. 3A-3C, some embodiments provide the introduction of an OOB authentication method by way of, e.g., a certificate-based mutual authentication model to secure the OOB communications.

Digital certificates, also known as identity certificates or public key certificates, are digital files issued by a Certificate Authority (CA), that are used to certify the ownership of a public key. Transport Layer Security (TLS) certificates are an example of digital certificate. This was preceded by Secure Sockets Layer (SSL) but that has now largely been replaced by TLS. The CA signs the digital certificate, certifying that they have verified that it belongs to the entity which is the subject of the certificate. When a user tries to connect to a server, the server sends them its TLS certificate. The user then verifies the server's certificate using CA certificates that are present on the user's device to establish a secure connection. This verification process uses public key cryptography, such as RSA or ECC, to prove the CA signed the certificate.

TLS certificate-based mutual authentication is a simple but effective scheme using service provider's existing internal system of trust based on a Public Key Infrastructure (PKI). This method is ideal for machine-to-machine (M2M) communication, especially as all clients and servers are known, and leverages the trust established in the HSM at the time of manufacturing for OOB bootstrap.

Certificate-based Mutual Authentication using TLS version 1.2 is used for securing and authenticating the OOB interface, i.e., authenticating the OOB client with the HSM for OOB management. After initial setup, it provides the most seamless and scalable method for the service provider to manage their HSM estates.

With reference to FIG. 3A, the method involves a server authentication step 310 at the HSM in the data center, and a client authentication step 320 at the service provider. The one skilled in the art will recognize that FIG. 3A illustrates a TLS handshake.

A detailed review of the methods of OOB authentication as shown in the flow chart of FIG. 3B and FIG. 3C would go beyond the objective of the present description, and the one with ordinary skills in the art shall be able to implement such mutual authentication scheme in view of the following brief description thereof which is to be considered in view of the flow chart of FIG. 3B continued in FIG. 3C.

The server authentication 310 of FIG. 3A can make use of a self-signed certificate and of a CA-signed Certificate.

As regards the self-signed certificate, first, it shall be noted that when the HSM is received from the factory, it would already contain the keypair and self-signed certificate for OOB communications:
an ECC secp384r1 keypair; and,
a self-signed certificate with the:
HSM's serial number in the Subject Common Name (CN) and the Issuer fields; and
Subject Alternative Name (SAN) field is not populated.
It shall be further appreciated that the auxiliary (AUX) IP address is not used for CN or SAN so that there is no need to generate a new self-signed certificate when the AUX IP is modified (via "CA" console command or via "/interface/aux" OOB endpoint).

Steps below outline the main use case of validating the HSM using the fingerprint of the certificate:
the fingerprint (SHA-256) of the self-signed certificate is printed via the console "HHSMCFG" command;
DCOps can provide this to the OOB client via some offline means;
OOB client would save this fingerprint in local storage;
During the TLS session setup, the OOB client would compare the fingerprint of the self-signed certificate presented by the HSM with the saved fingerprint for that particular HSM;
if the fingerprint is not validated, the TLS session is terminated and appropriate alerts can be raised.
If the certificate is not added to the client's trusted certificate store after the initial fingerprint validation, the OOB client has to perform the fingerprint validation for each OOB request.

As regards now the server CA-signed Certificate, it will be appreciated that two OOB API endpoints can be available to install a CA-signed certificate on the HSM, namely:
"/certificate/server/createCsr" which allows the HSM to create a keypair/CSR to sign with service provider's internal PKI; and, "/certificate/server/install" which installs this signed certificate in the HSM and secures the OOB interface with that certificate.

It is recommended that the installation of a trusted certificate be one of the first configuration actions to be carried out upon receipt of the HSM from the factory and physical installation in the data center.

Let us now turn to the client authentication 320 (see FIG. 3A).

The HSM 200 can authenticate OOB API requests by validating that the client possesses a certificate and associated private key signed by a trusted CA. Each OOB client should have a client certificate signed by a trusted CA that is part of the service provider's internal PKI.

Two options are provided for loading the client CA certificate:

Console command "LOADCLIENTCA"; and,
OOB API endpoint "/certificate/client/loadCa".

The initial loading of trusted CA certificate could be done at the local console 202 by DCOps. Once the HSM has the trusted client CA certificate chain, further updates to the trust store can be done via authenticated OOB sessions. According to the above first option, a console command "LOADCLIENTCA" is available for DCOps to load the client CA certificate chain.

It expects the client CA certificate chain file to be available on the USB drive (plugged into the USB-A interface on the HSM back panel).

To use this command, the operator (DCOps) should carry out the following steps:

copy the client CA file to a USB drive;
plug it into the USB-A interface 210 on the back panel;
run the "LOADCLIENTCA" command from local console 202 which lists the files with ".crt" extension that are present on the USB drive; and,
choose the certificate file to load;
this will overwrite any previously loaded client CA certificate chain.

Client authentication in TLS will be enforced once the client CA certificate chain is successfully loaded.

With respect to the above second option, the one with ordinary skills in the art will appreciate that the functionality provided by the "LOADCLIENTCA" console command is also provided via an OOB API endpoint "/certificate/client/loadCa". The client CA certificate file must be provided as input.

The example sequence diagram of FIG. 3B (continued in FIG. 3C via the connection marks labelled "A" and "B" at the bottom of FIG. 3B and at the top of FIG. 3C, respectively) shows the configuration and command sequence for establishing authenticated OOB communications as per the provisions as explained above.

The following can be the flow for setting up the initial trust with the HSM.

At 31, the DCOps runs "CA" command at local console 202 to configure the auxiliary interface 30.

Optionally, DCOps can also run the "LOADCLIENTCA" command which installs client's trusted CA certificate chain. The HSM would start enforcing client certificate authentication during TLS session establishment which is commenced at 32.

At 33, the OOB client sends OOB API request to HSM to generate keypair/CSR.

At 34, the CSR is signed by the service provider's internal PKI entity.

At 35, the OOB client sends OOB API request to install the signed certificate in the HSM.

Finally, at 36, the HSM's OOB communications are restarted using the newly installed certificate for all future communications.

The implementation of the above-described mutual authentication scheme solves the problem subsequently identified of how to remotely and securely:

i) authenticate the Service Provider hosting the HSM, and
ii) authenticate the End-User client during the different state transitions (allocate, reclaim, commission, and release).

To this point, and included in non-limiting embodiments of the invention are means for OOB authentication for both Server and Client as described above in view of FIGS. 3A-3C.

Other related problems commonly found in a hosted HSM infrastructure can be solved by way of OOB API endpoints specific to HSM utilities that are exposed through the RESTful API. For example, the question of how to allow unauthenticated clients prior to loading the client CA certificate chain can be solved by limiting access to the OOB interface via a set of OOB API endpoints with respective methods. The question of how to restrict access to the OOB interface can be solved by setting up the HSM with a list of domain host names for whitelisting OOB clients using a specific OOB API endpoint.

Figure 4:
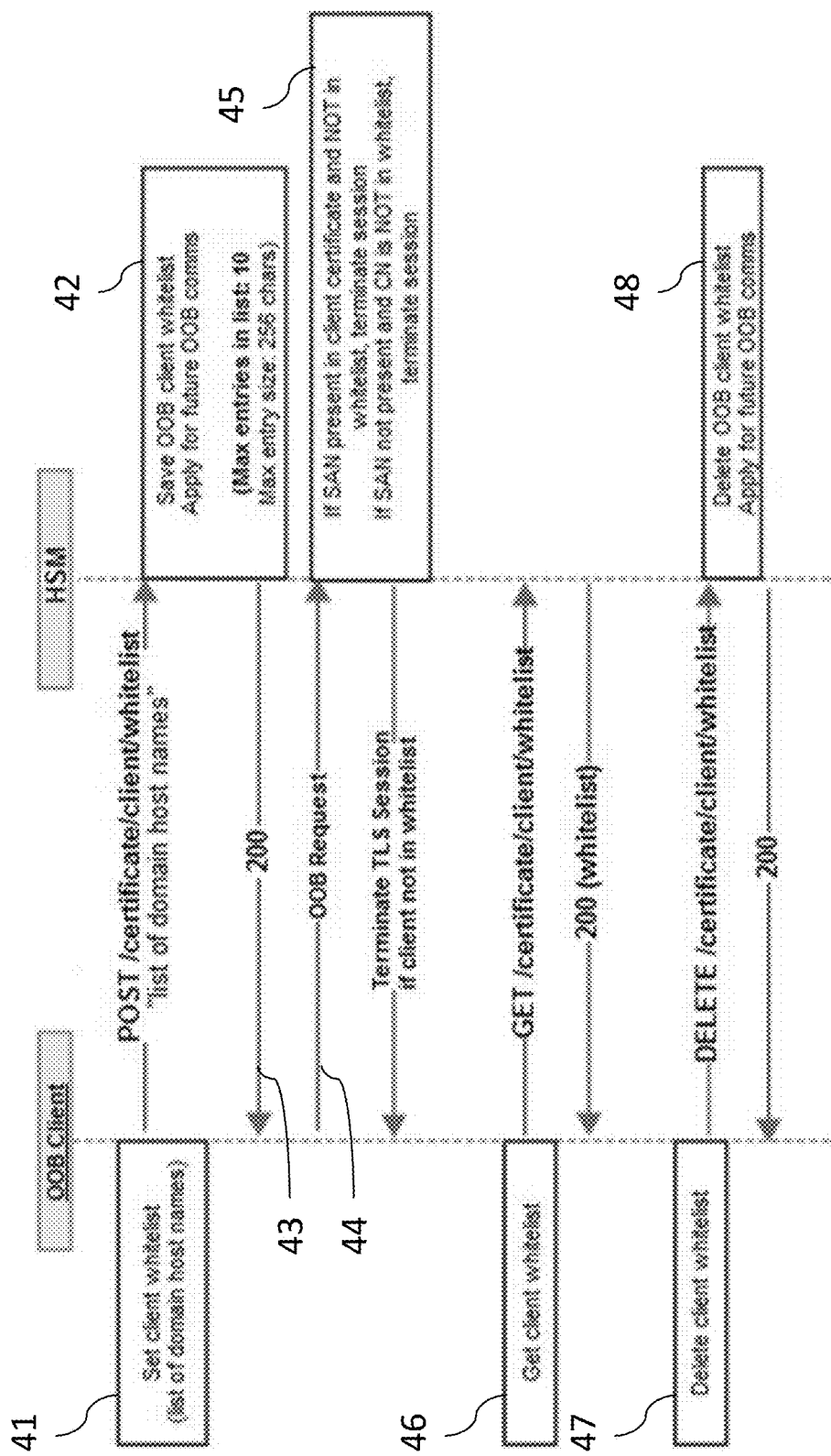
FIG. 4 is a step diagram illustrating an example "whitelist" type protection scheme which can be implemented to restrict access to the OOB interface according to embodiments.

Referring to the flow chart of FIG. 4, indeed, there will now be described a method for client whitelisting to restrict access to the AUX interface 30 dedicated to OOB management.

At 41, the HSM can be setup with a list of domain host names for whitelisting OOB clients using the OOB API endpoint "POST /certificate/client/whitelist".

On the HSM side, the list of domain host names is taken as input, at 42. By way of example only, it can be provided that the number of entries in the whitelist be limited to ten entries. Also, the entry size can be limited to 256 characters at maximum. Embodiments are not limited to these examples, which are illustrative only.

If the request is processed successfully by the HSM, it will acknowledge so with a 200 response, at 43.

Each time the whitelist is set, the HSM will overwrite the previous list (if any) and apply the new list for future OOB connections.

The use of the whitelist can be as follows. When the OOB client attempts an OOB API, at 44:

SAN(s) from the client certificate are checked against the whitelist at 45;
if SAN is not present, then Common Name (CN) field in the corresponding client certificate is checked against the whitelist stored in the HSM; and,
if the OOB client is not whitelisted, the TLS session is terminated.

For example, the OOB client can retrieve the whitelist by using the request "GET /certificate/client/whitelist" at 46, and can have the whitelist deleted in the HSM at 48, by using "DELETE /certificate/client/whitelist" at 47, which is then applicable for future OOB connections.

In further embodiments, the question of how to install certificates via OOB management if one was not installed or needs to be updated, and how get the fingerprint of the certificate in current use for OOB management can be solved, again, by exposing OOB API endpoints with POST, PUT and GET methods.

Figure 5:
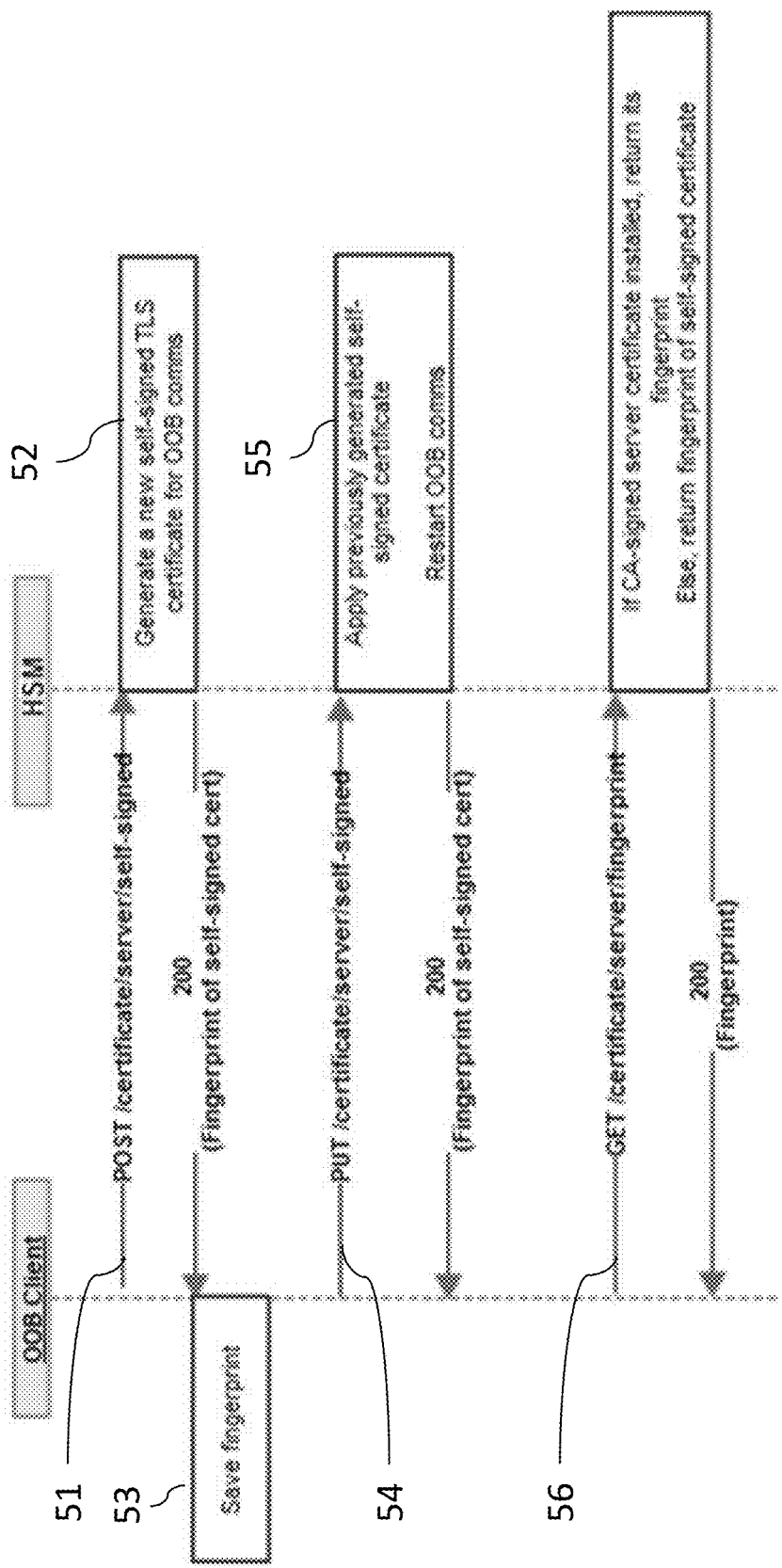
FIG. 5 is a step diagram illustrating an example a method of managing self-signed certificates which can be implemented by way of the OOB management according to embodiments.

As illustrated by the flow chart of FIG. 5, said embodiments rely on a method for managing self-signed certificates by way of the proposed OOB management. For example, said managing comprises generating, updating and/or fingerprinting such certificates. The mechanism allows service providers to satisfy internal certificate rotation policies, when applicable. Again, embodiments can implement such a mechanism by means of the RESTful API as already presented above, in a way that will now be explicated.

Indeed, the RESTful API exposes methods for generating a new self-signed certificate and returning its fingerprint to the client by way of a POST request, and a separated action for saving the fingerprint before it is applied to the HSM by way of a PUT request.

If the CA-signed server certificate was not installed and the HSM's self-signed certificate has to be updated via OOB, the following OOB API endpoints can be used for this purpose:

at 51, the OOB client issues a POST /certificate/server/self-signed request.

at 52, the HSM generates a new self-signed certificate and return its fingerprint to the client within a 200 response. Said fingerprint is saved by the OOB Client at 53.

at 54, the OOB client issue a PUT /certificate/server/self-signed request.

Responsive to said request, the HSM applies the newly generated self-signed certificate at 55.

This action is separated out so that the OOB client can save at 53 the fingerprint of the newly generated self-signed certificate returned in the "POST /certificate/server/self-signed" response before instructing, at 54, the HSM to apply the certificate using "PUT /certificate/server/self-signed".

Additionally, there is another API endpoint to get the fingerprint of the certificate currently used for OOB management. In the example as shown in FIG. 5, this is obtained by the OOB client issuing a GET /certificate/server/fingerprint request at 56. This API endpoint returns the fingerprint of the CA-signed certificate if it was installed, otherwise it will return the fingerprint of the self-signed certificate.

The one with ordinary skills in the art will note that the self-signed certificate and the CA-signed certificate are mutually exclusive. If a CA-signed certificate was installed via "/certificate/server/install", then it would be used for the OOB TLS session replacing any previously installed CA-signed or self-signed certificate. Additionally, once the CA-signed certificate is installed, updates to self-signed certificate are not allowed.

In still further embodiments, the question of how to attest that the HSM was officially manufactured and warranted by the HSM manufacturer is solved by having the client send a "challenge data" to the HSM that only a legitimately certified HSM could properly respond. Indeed, an advantageous feature can be implemented in such non-limiting embodiments is a method for HSM attestation to prove that the HSM was officially manufactured and is warranted by its legitimate manufacturer.

This method will now be described with reference to FIG. 6. As per this method, the client sends a "challenge data" to the HSM that only a legitimately certified HSM could properly respond. More specifically, the HSM will inject random data (commonly known as a "nonce" by the one with ordinary skills in the art) into the challenge data, then perform a hash function on the combined "challenge data+nonce", and finally sign the hash with the private key of the HSM's factory installed warrant. The client thereafter validates the certificate chain against the root certificate received from the true manufacturer, and validates the signature using the warrant certificate.

Figure 6:
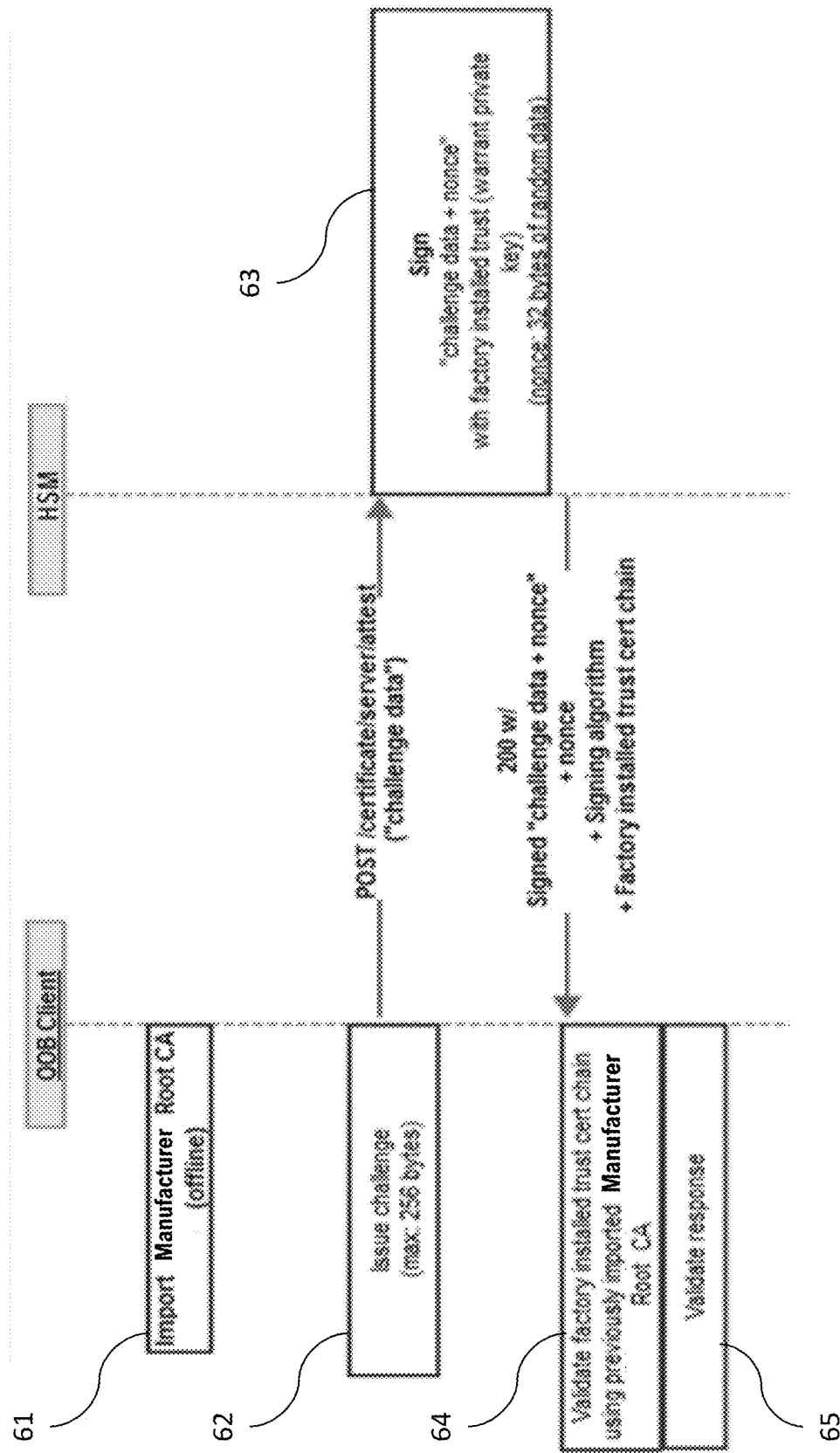
FIG. 6 is a step diagram illustrating an example challenge-response authentication scheme which can be implemented for providing HSM attestation of origin to users, according to embodiments.

The OOB client as shown in FIG. 6 can use the "/certificate/server/attest" out-of-band API to attest that the HSM was officially manufactured and warranted by Thales. The attest API can be used for secure ship validation.

For attestation, the root certificate must be received from the true manufacturer (offline) and imported/loaded onto the OOB client at 61.

Below is the outline of using, by way of a non-limiting example, the proposed "/certificate/server/attest" out-of-band API:

at 62, the OOB client generates and sends a "challenge data" of, e.g., 256 bytes maximum length, for the HSM to sign with its factory installed warrant key;

at 63, the HSM carries out the following steps:

Inject the nonce, comprised of e.g., 32 bytes of random data, into the challenge data received from the OOB client;

Perform a Hash function (for instance a well-known SHA-256 function) on the combined "challenge data+nonce" data; then, Sign the resulting data with signature algorithm such as the well-known Elliptic Curve Digital Signature Algorithm (ECDSA), for instance, using the private key of the HSM's factory installed warrant; and finally Return the following in a 200 response to the OOB client:

The Base64 encoded signature;

The Base64 encoded nonce;

The Signing algorithm; and,

The Base64 encoded PEM representation of the factory installed warrant certificate chain (minus the root certificate).

Upon receipt of the 200 response, the OOB client should, at 64:

Validate the warrant certificate chain against the root certificate received from the manufacturer Validate the signature using the warrant certificate by performing the following steps:

Base64 decode the "response";

Base64 decode the nonce;

Combine the original "challenge data+nonce";

Compute the Hash function applied to the "combined data" using the digest mechanism from the signature algorithm used for signing by the HSM; and, finally, Verify the signature against the public key of the warrant certificate.

In case of a matching verification result, the OOB shall validate the response, at 65.

It goes without saying, as the skilled person will appreciate, that details of such challenge-response authentication scheme may vary depending on the constraints and objectives of any specific application. Obviously, other authentication schemes can also be contemplated for providing HSM attestation of origin to the service providers using the HSM.

Further embodiments can allow additional solutions to conduct a HSM firmware update. Indeed, the service provider can update the firmware in the DataCenter state using the OOB API /update/firmware. For fall back, firmware update is allowed (in secure keylocks state) from the local console using the UPLOAD console command (with the firmware update file available on the USB drive). Preferably, end user can also update firmware via the HSM Manager interface, as was readily the case before the invention.

Similarly, both the service provider and the customer can load/update licenses on the HSM. On the one hand, the customer can use the HSM Manager interface to load a new license. On the other hand, the service provider can load a new license either by using the OOB API endpoint /update/license, in all provisioning states of the HSM (DataCenter, Allocated or EndUser), or by using the UPLOAD command via the local console (only in the DataCenter state of the HSM).

Figure 7:
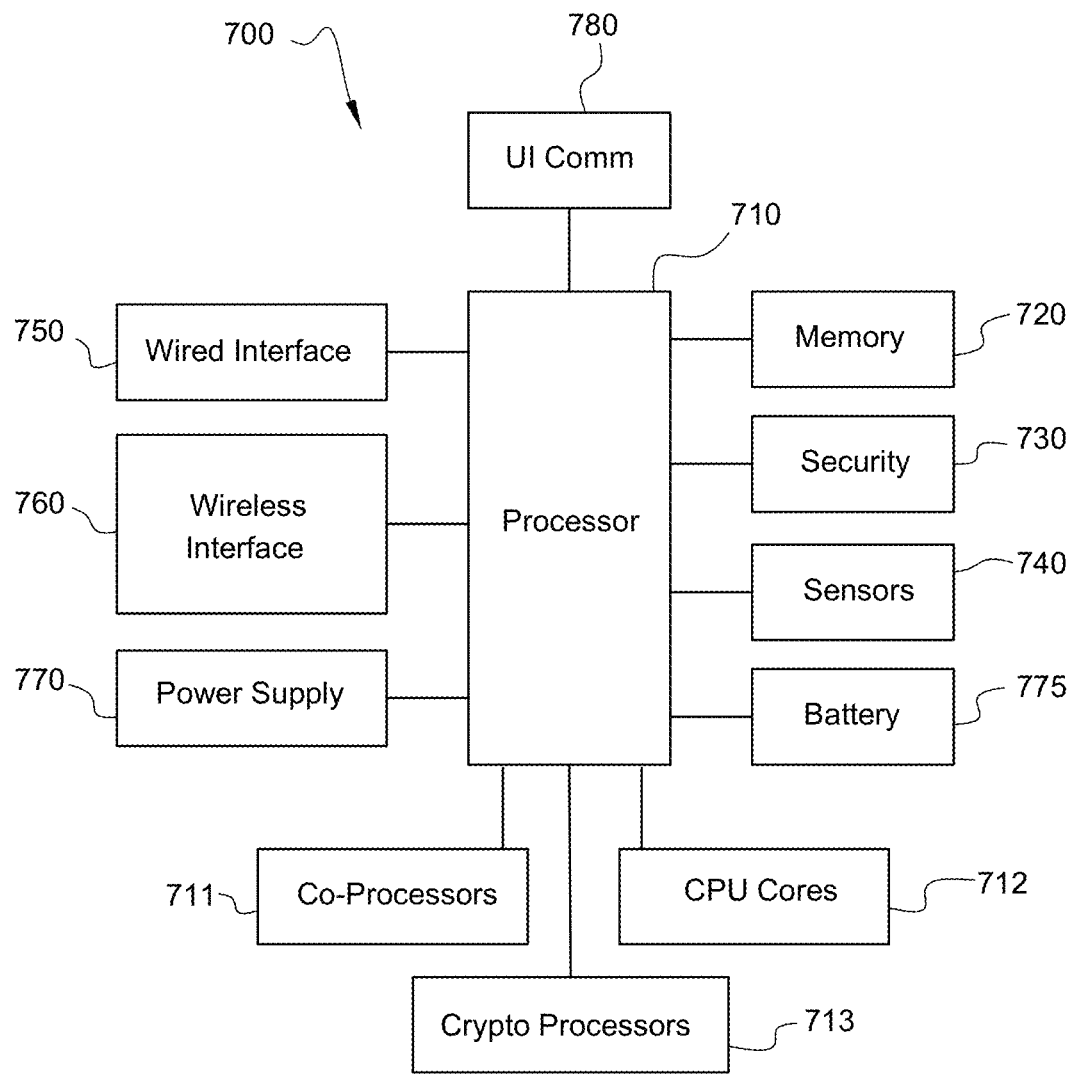
FIG. 7 is a block-diagram illustrating a hardware platform suitable for use within a crypto processing environment of the HSM in accordance with embodiments.

FIG. 7 illustrates a hardware platform 700 suitable for use as, or within, a crypto processing environment supporting the HSM in accordance with one embodiment. The platform 700 includes a processor 710, a memory 720, and a security 730, sensors 740, a wired interface 750, a wireless interface 760, a power supply 770 and a battery 775. These components may be communicatively coupled as shown or by direct hardware interfaces there between, including, but not limited to electronics, circuits, wires, lines, logic, or gates, where suitable.

The processor 710 may include one or more data processing circuits, such as a general purpose and/or special purpose processor, such as a microprocessor and/or digital signal processor (e.g., GPU, μP, ASIC, DSP, CPLD, IC, etc.). The processor 710 is configured to execute computer program code stored in the memory 720, described below as a non-transitory computer readable medium, to perform at least some of the operations described herein as being performed by an identified component, module or software block. The computer program code can include computer instructions, assembly code, firmware, or embedded code, machine code, that when executed by the processor 710 causes the processor 710 to perform operations in accordance with one or more embodiments disclosed herein.

Specific examples (a non-exhaustive list) of the computer readable storage medium exemplified by memory 720 can include the following: a hard disk, a random access memory (RAM), a read-only memory (ROM), an erasable programmable read-only memory (EPROM), Flash memory (NAND, NOR), a solid state device (SSD), an appropriate optical fiber (FICON) with a repeater, an optical storage device, a magnetic storage device, or any suitable combination of the foregoing.

The processor 710 may also be communicatively attached to a co-processor 711 (on-board or off board), one or more CPU cores 712 and one or more crypto processors 713 (e.g., HW crypto accelerator) that assist in off-loading computational or processing tasks.

The sensors 740 can detect or measure a physical property and record, indicate, or otherwise responds to the sensory information. The sensors 740 provide for measurement of temperature, humidity, radio frequency, electromagnetic, light, force, pressure, acceleration, movement, position, tilt, and other physical interaction and environmental conditions. The Sensors 740 may further include a signal comparator, a phase comparator, an analog-to-digital converter, amplifier, signal filter, etc. used to enable the processor 710 to receive and process signals from one or more sensors.

The security module 730 provides for monitoring of security violations, security risks, unauthorized uses and attacks on the platform 700. It may be a mixed signal low-power microcontroller that include decision logic, memory or software and that communicatively couples to the sensors 740 and the processor 710. The security module 730 may include software and logic, or share resources and responsibilities with the processor 710, to detect security events, such as tamper levels, thresholds, and conditions.

The platform 700 may include a wired network communication interface 750 and/or a wireless interface 760, for example, a radio access communication transceiver. The wired network interface can include standard computer networking interfaces used in local area networks (LAN), wide area networks (WAN), over the Cloud, and the Internet and other frame based or packed based networks. The Ethernet interface can use TCP/IP and UDP protocols for 10/100/1000 Mbps transmission over standard Cat 5, Cat 5e, or Cat 6 cables. The radio access communication transceiver can include, but is not limited to, a LTE or other cellular transceiver, WLAN transceiver (IEEE 802.11), WiMAX transceiver, Bluetooth transceiver, NFC transceiver, Radio Frequency Identification (RFID) or other radio communication transceiver configured to communicate directly or indirectly (e.g., via a radio access node) with a network node.

The platform 700 may include User Interface (UI) communication (COMM) modules 780, for example, electronic data exchange or generic communication, such as Universal Serial Bus (USB), RS-232 serial port, smart card reader, Graphical User Interfaces (GUI), Light Emitting Diodes (LED), or other user related I/O interfaces.

The power supply 770 provides power to the electronic components of platform 700 and can include regulators and converters to provide required voltage and current requirements. The battery 775 can also provide power, for example, in low-power modes or when otherwise required for security reasons.

The one with ordinary skills in the art will appreciate that, though embodiments as described in the above can be implemented in a distributed network architecture, such as a Web-based (or Cloud-based) payment system.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

A person skilled in the art will readily appreciate that various parameters disclosed in the description may be modified and that various embodiments disclosed and/or claimed may be combined without departing from the scope of the invention.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

It is stipulated that the reference signs in the claims do not limit the scope of the claims, but are merely inserted to enhance the legibility of the claims.

The invention claimed is:

1. A payment Hardware Security Module (HSM), comprising:

a first interface configured to allow remote access to the payment HSM over a communication network by at least one remote end-user entity running at least one payment application adapted to use critical resources protected in the payment HSM when said payment HSM is physically hosted in a data center accessible through said communication network;

a second interface supported by a given communication channel over the communication network and configured to allow for main, operational management of the payment HSM by the at-least one remote end-user entity;

a third interface supported by a communication channel over the communication network being distinct and physically isolated from the given communication channel of the second interface, and configured to allow secure access to the payment HSM by a third-party entity, distinct from the at-least one remote end-user entity, for Out-Of-Band (OOB) management of the payment HSM by the third-party entity; and a processor configured to implement a resident, remotely configurable provisioning state-machine for management of provisioning of the payment HSM for service to one or more end-user entities, through one or more transitioning methods under control of the third-party entity over the third interface as part of the OOB management, a memory on which are stored machine-readable instructions that, when executed by the processor, cause the processor to additionally perform said remote access allowed by said first interface, said main, operational management allowed by the second interface, and said secure access allowed by the third interface.

2. The payment Hardware Security Module of claim 1, wherein the provisioning state-machine is configurable by the third-party entity via one or more specific Application Program Interfaces (APIs) adapted to implement the transitioning methods.

3. The payment Hardware Security Module of claim 2, wherein the provisioning state-machine is configurable by the third-party entity via the one or more specific APIs complying with a Representational State Transfer (REST) style of architecture and adapted to implement the transitioning methods as REST methods.

4. The payment Hardware Security Module of claim 1, wherein the provisioning state-machine comprises at least three states, including a first state of the payment HSM not being allocated to an end user, a second state of the payment HSM being allocated to an end-user but not being commissioned for said end-user, and a third state of the payment HSM being commissioned for the end-user.

5. The payment Hardware Security Module of claim 1, wherein the transitioning methods comprise one or more of:
allocating the payment HSM to a given end-user;
commissioning the payment HSM for the given end-user to which said payment HSM was allocated;
voluntarily releasing the payment HSM by the given end-user to which said payment HSM was allocated and for which the payment HSM was commissioned; and
reclaiming by the third party entity of the payment HSM that was allocated to an end-user.

6. The payment Hardware Security Module of claim 1, wherein the third interface is configured to allow secure access to the payment HSM by the third-party entity based on one or more of a mutual authentication scheme, a client white-listing scheme, a fingerprinting scheme and a server attestation scheme to restrict access to the third interface.

7. The payment Hardware Security Module of claim 6, wherein the mutual authentication scheme is adapted to implement a certificate-based mutual authentication.

8. The payment Hardware Security Module of claim 7 wherein the certificate-based mutual authentication is Transport Layer Security (TLS) certificate-based mutual authentication.

9. The payment Hardware Security Module of claim 1, wherein the third interface is further configured to allow key management and access control policy enforcement by the third-party entity, as part of the OOB management of the hosted payment HSM in addition to the provisioning management.

10. The payment Hardware Security Module of claim 1, wherein the critical resources protected in the payment HSM are selected from the group consisting of digital keys, PIN codes, and encryption and decryption functions usable by the payment application run by the at least one remote end-user entity.

11. The payment Hardware Security Module of claim 1, further comprising a hardware interface.

12. A Web-based payment system comprising:
at least one payment Hardware Security Module (HSM) physically hosted in a data center and remotely accessible, over a communication network, by at least one remote end-user entity running at least one payment application adapted to use critical resources protected in the at least one payment HSM,
said at least on payment HSM comprising:
a processor; and
a memory on which are stored machine-readable instructions that, when executed by the processor, cause the processor to perform configuration of:
a first interface to allow remote access to the at least one payment HSM over the communication network by the at least one remote end-user entity;
a second interface supported by a given communication channel over the communication network to allow for main, operational management of the at least one payment HSM by the at least one remote end-user entity,
a third interface supported by a communication channel over the communication network being distinct and physically isolated from the given communication channel of the second interface, to allow secure access to the at least one payment HSM by a third-party entity, distinct from the at least one remote end-user entity, for Out-Of-Band (OOB) management of the at least one payment HSM by the third-party entity,
and cause the processor to additionally implement a resident, remotely configurable provisioning state-machine for management of provisioning of the payment HSM for service to one or more end-user entities, through one or more transitioning methods under control of the third-party entity over the third interface as part of the OOB management.

13. The Web-based payment system of claim 12, wherein the provisioning state-machine is configurable by the third-party entity via one or more specific Application Program Interfaces (APIs) adapted to implement the transitioning methods.

14. The Web-based payment system of claim 12, wherein the provisioning state-machine comprises at least three states, including a first state of the payment HSM not being allocated to an end user, a second state of the payment HSM being allocated to an end-user but not being commissioned for said end-user, and a third state of the payment HSM being commissioned for the end-user.

15. The Web-based payment system of claim 12, further comprising a local console configured to execute solely initial configuration of the hosted payment HSM through a hardware interface.

16. A method of deploying a Web-based payment system to an end-user entity comprising the steps of:
- by way of a payment Hardware Security Module, HSM, physically hosted in a data center accessible through a communication network and operatively configured to enter one of
  - a first state of the payment HSM not being allocated to an end user entity,
  - a second state of the payment HSM being allocated to an end-user entity but not being commissioned for said end-user entity, and
  - a third state of being the payment HSM commissioned for the end-user entity running at least one payment application adapted to use critical resources protected in said payment HSM by way a first interface configured to allow remote access to the payment HSM over said communication network by said end-user entity:
- from the first state, by way of a second interface supported by a given communication channel over the communication network and configured to allow for main, operational management of the payment HSM by the end-user entity, transitioning from the first state to the second state; and,
- from the second state, upon a successful commissioning of the payment HSM by the end-user entity, by way of a third interface supported by a communication channel over the communication network being distinct and physically isolated from the given communication channel of the second interface and configured to allow secure access to the payment HSM by a third-party entity, distinct from the end-user entity, for Out-Of-Band (OOB) management of the payment HSM by said third-party entity, transitioning from the second state to the third state.

17. The payment Hardware Security Module of claim 11 wherein the hardware interface is a serial interface.

18. The payment Hardware Security Module of claim 17 wherein the serial interface is a USB-C interface configured to allow a local console to execute solely initial configuration of the hosted payment HSM.

* * * * *